(12) United States Patent
Min et al.

(10) Patent No.: US 12,036,939 B2
(45) Date of Patent: Jul. 16, 2024

(54) DRIVER AIRBAG MODULE WITH LIGHTING DEVICE, CONTROL METHOD, AND MANUFACTURING METHOD OF SAME

(71) Applicants: Hyundai Motor Company, Seoul (KR); Kia Corporation, Seoul (KR); ZF Overseas Inc., Valley View, OH (US)

(72) Inventors: Jun Yong Min, Gyeonggi-Do (KR); Seong Bin Kim, Gyeonggi-Do (KR); Dae Kyo Jang, Gyeonggi-Do (KR); Sun Woo Yoo, Gyeonggi-Do (KR); Mun Gyu Song, Gyeonggi-Do (KR)

(73) Assignees: Hyundai Motor Company, Seoul (KR); Kia Corporation, Seoul (KR); ZF Overseas Inc., Valley View, OH (US)

( * ) Notice: Subject to any disclaimer, the term of this patent is extended or adjusted under 35 U.S.C. 154(b) by 0 days.

(21) Appl. No.: 17/984,789

(22) Filed: Nov. 10, 2022

(65) Prior Publication Data

US 2024/0042956 A1     Feb. 8, 2024

(30) Foreign Application Priority Data

Aug. 5, 2022    (KR) ........................ 10-2022-0098078

(51) Int. Cl.
    *B60R 21/203*      (2006.01)
    *B60Q 3/20*      (2017.01)
    (Continued)

(52) U.S. Cl.
    CPC ............. *B60R 21/203* (2013.01); *B60Q 3/20* (2017.02); *B60Q 3/283* (2017.02); *B60Q 3/70* (2017.02);
    (Continued)

(58) Field of Classification Search
    CPC ................ B60R 21/203; B60R 21/215; B60R 21/21656; B60R 21/2032; B60R 21/2035;
    (Continued)

(56) References Cited

U.S. PATENT DOCUMENTS 5,516,143 A    *   5/1996   Lang ..................... B60R 21/215
                                                                   200/313
8,925,959 B2      1/2015   Bosch et al.
    (Continued)

FOREIGN PATENT DOCUMENTS

CN         113734178 A   *   12/2021
JP        2017-021231 A      1/2017
    (Continued)

*Primary Examiner* — Keith J Frisby
(74) *Attorney, Agent, or Firm* — Fox Rothschild LLP

(57) ABSTRACT

A driver airbag module with a lighting device is proposed. The driver airbag module comprises an airbag cover, covering a driver airbag, configured to unfold toward a front space of a driver when the driver airbag is operated, wherein the airbag cover is located above the driver airbag. The airbag module further comprises the lighting device, wherein the lighting device comprises a plurality of lamps which are arranged to be spaced apart from each other, configured to emit light, located below the airbag cover, and coupled to the airbag cover such that the light emitted from the plurality of lamps is exposed to an upper space of the airbag cover. The airbag module further comprises a lighting controller configured to control flashing of the lighting device based on a driving condition of a vehicle, a charging status of a power source, and/or a driver condition.

10 Claims, 15 Drawing Sheets

(51) Int. Cl.
  *B60Q 3/283*   (2017.01)
  *B60Q 3/70*    (2017.01)
  *B60R 21/215*  (2011.01)
  *B60R 21/2165* (2011.01)

(52) U.S. Cl.
  CPC ...... *B60R 21/215* (2013.01); *B60R 21/21656* (2013.01)

(58) Field of Classification Search
  CPC ........ B60R 21/2037; B60Q 3/20; B60Q 3/70; B60Q 3/283; B60Q 2400/40; B29L 2031/3038
  USPC .................. 280/728.1, 728.3, 730.1, 731
  See application file for complete search history.

(56) References Cited

U.S. PATENT DOCUMENTS

| | | |
|---|---|---|
| 10,507,764 B2 | 12/2019 | Schneider et al. |
| 11,383,639 B1 * | 7/2022 | Kwon ................... B60Q 3/64 |
| 2021/0101639 A1 * | 4/2021 | Chiu .................. B60Q 3/283 |
| 2023/0158994 A1 * | 5/2023 | Wimbert ............... B60Q 3/14 |
| | | 280/728.3 |

FOREIGN PATENT DOCUMENTS

| | | | |
|---|---|---|---|
| KR | 10-2011-0074888 A | | 7/2011 |
| KR | 101633072 B1 | | 6/2016 |
| KR | 102036223 B1 | | 10/2019 |
| KR | 20210076342 A | * | 6/2021 |
| KR | 102352123 B1 | | 1/2022 |

\* cited by examiner

0 ≤ recharge < 25%

210

25% ≤ recharge < 50%

50% ≤ recharge < 75%

75 ≤ recharge ≤ 100%

DRIVER AIRBAG MODULE WITH LIGHTING DEVICE, CONTROL METHOD, AND MANUFACTURING METHOD OF SAME

CROSS REFERENCE TO RELATED APPLICATION(S)

The present application claims, under 35 U.S.C. § 119(a), the benefit of Korean Patent Application No. 10-2022-0098078, filed on Aug. 5, 2022, the disclosure of which is incorporated herein by reference in its entirety.

BACKGROUND

Technical Field

Embodiments of the present disclosure relate generally to a driver airbag module with a lighting device and, more particularly, to an airbag system with a lighting device provided in an airbag cover mounted to a steering wheel so as to provide information about vehicle conditions to a driver.

Background

Airbag modules are generally used to aid in ensuring the safety of a passenger within a vehicle. Vehicles generally comprise airbag modules unfolded at various positions, such as a front portion and a side portion, to protect a driver and passengers.

Specifically, a driver airbag is generally mounted to a steering wheel to protect the front portion of the driver. When the driver drives the vehicle, a part of the vehicle that faces the driver at the nearest location is the steering wheel. Therefore, in order to achieve an aesthetic effect and the communication between the vehicle and the driver, a technology of mounting a lighting device to the steering wheel has been developed.

An airbag unfolded in a vehicle collision is operated by an explosion of concentrated gunpowder and, at this time, a force applied to an airbag cover is large. However, in order to provide efficient visual delivery to the driver, the lighting device mounted to the driver airbag should be mounted to the airbag cover to which largest explosion force is transmitted. Accordingly, when the airbag is unfolded, there was a problem in that a risk is generated by separation or breakage of the lighting device.

SUMMARY

Accordingly, the present disclosure has been made keeping in mind the above problems occurring in the existing technologies, and the present disclosure is intended to propose a driver airbag module with a lighting device, wherein the driver airbag module is equipped with the lighting device that is prevented from being separated and broken even in unfolding of an airbag so as to achieve the aesthetic effect and the communication between a vehicle and a driver.

In order to achieve the above objective, according to one aspect of the present disclosure, there is provided a driver airbag module with a lighting device, the driver airbag may comprise: an airbag cover covering a driver airbag configured to be unfolded toward a front space of a driver when the driver airbag is operated, wherein the airbag cover is located above the driver airbag. The lighting device comprises a plurality of lamps arranged to be spaced apart from each other and are configured to emit light, are located below the airbag cover, and are coupled to the airbag cover such that the light emitted from the plurality of lamps may be exposed to an upper space of the airbag cover. The airbag module further comprises a lighting controller configured to control flashing of the lighting device. The lighting controller may be configured to control the flashing of the lighting device based on a driving condition of a vehicle, a charging status of a power source, and/or a driver condition.

The airbag cover may be configured to be mounted to a center portion of a steering wheel of the vehicle together with the driver airbag in a non-operation state of the driver airbag.

The airbag cover may be configured to comprise a plurality of penetration holes through which the light penetrates, and the driver airbag module may comprise a diffuser inserted into the plurality of penetration holes, and configured to expose the light of the plurality of lamps toward the upper space of the airbag cover.

The lighting controller may be configured to control the lighting device such that the plurality of lamps may be turned on or off in a preset pattern, or be turned on in a preset color.

When a risk in the driving condition of the vehicle is detected, the lighting controller may be configured to control the lighting device in a pattern in which the plurality of lamps may be simultaneously turned on having light of a preset warning color and then simultaneously turned off.

When it is detected that the vehicle is in a normal charging status of the power source, the lighting controller may be configured to control the lighting device in a pattern in which some or all of the plurality of lamps may be turned on at a ratio corresponding to a charging amount of the power source, or, when it is detected that the vehicle is in an abnormal charging status of the power source, the lighting controller may be configured to control the lighting device in a pattern in which the plurality of lamps may be simultaneously turned on, having light of a preset warning color.

When it is detected that the driver condition is a boarding state into the vehicle or a leaving state from the vehicle, the lighting controller may be configured to control the lighting device in a pattern in which the plurality of lamps may be sequentially turned on and off from a first side to a second side thereof, or the plurality of lamps may be gradually turned on from the first side to the second side thereof.

When it is detected that the driver condition is a state in which the driver inputs manipulation into the vehicle, the lighting controller may be configured to control the lighting device in a pattern in which the plurality of lamps may be simultaneously turned on having light of a preset manipulation color and then the plurality of lamps may be simultaneously turned off.

The lighting controller may be configured to control the lighting device such that, among the plurality of lamps, brightness of a lamp located at a relatively or generally outer portion of the airbag cover may be lower than brightness of a lamp located at a center portion of the airbag cover.

The plurality of lamps may be arranged in a straight line while being spaced apart from each other.

A control method of a driver airbag module with a lighting device, which may be coupled to an airbag cover so that light emitted from a plurality of lamps located below the airbag cover may be exposed toward an upper space of the airbag cover, may comprise inputting a driving condition of a vehicle, a charging status of a power source, and/or a driver condition, the method may further comprise controlling flashing of the lighting device. The controlling the flashing of the lighting device may be based on the driving condition of the vehicle, the charging status of the power source, and/or the driver condition, such that the plurality of lamps may be turned on or off in a preset pattern or turned on in a preset color.

When it is detected that a risk is in the driving condition of the vehicle, the controlling the flashing of the lighting device may be performed such that the lighting device may be controlled in a pattern in which the plurality of lamps may be simultaneously turned on having light of a preset warning color and then the plurality of lamps may be simultaneously turned off.

When it is detected that the vehicle is in a normal charging status of a power source, the controlling the flashing of the lighting device may be performed such that the lighting device may be controlled in a pattern in which some or all of the plurality of lamps may be turned on at a ratio corresponding to a charging amount of the power source.

When it is detected that the vehicle is in an abnormal charging status of the power source, the controlling the flashing of the lighting device may be performed such that the lighting device may be controlled in a pattern in which the plurality of lamps may be simultaneously turned on having light of a preset warning color.

When it is detected that the driver condition is a boarding state into the vehicle or a leaving state from the vehicle, the controlling the flashing of the lighting device may be performed such that the lighting device may be controlled in a pattern in which the plurality of lamps may be sequentially turned on and off from a first side to a second side thereof or the plurality of lamps may be gradually turned on from the first side to the second side thereof.

When the driver condition is a manipulation input state into the vehicle, the controlling the flashing of the lighting device may be performed such that the lighting device may be controlled in a pattern in which the plurality of lamps may be simultaneously turned on having light of a preset manipulation color and then simultaneously turned off.

A manufacturing method of a driver airbag module with a lighting device may comprise injection-molding an airbag cover, which may have a plurality of penetration holes through which light penetrates, with a fixing tool of a deformable material inserted therein, locating a circuit board with a plurality of lamps below the airbag cover, and coupling the circuit board to the airbag cover while the circuit board may be fixed to the airbag cover by deforming the fixing tool.

The manufacturing method may comprise, before the locating the circuit board, inserting a diffuser into the plurality of penetration holes to expose light emitted from the plurality of lamps toward an upper space of the airbag cover, wherein the locating of the circuit board may be performed by locating the plurality of lamps to correspond to a position of the diffuser.

The manufacturing method may comprise, before the locating the circuit board, arranging a sealant at an upper portion of the circuit board; and fixing the circuit board to a circuit housing in a snap structure, wherein the coupling of the circuit board may be performed by coupling the circuit housing to the airbag cover.

The coupling of the circuit board may be performed by fixing primarily the circuit housing to the airbag cover by bending the fixing tool with the circuit board located below the airbag cover, and by coupling the circuit housing to the airbag cover in a fusion method at a bending position of the fixing tool and a position spaced apart from the bending position.

According to the driver airbag module with a lighting device of the present disclosure, and the control method and the manufacturing method of the same, an emblem mounted to the steering wheel may be replaced with the driver airbag module.

Furthermore, the convenience and the stability of driving can be improved and emotional interaction between the driver and the vehicle can be realized by the communication between the driver and the vehicle.

DETAILED DESCRIPTION

Figure 1:
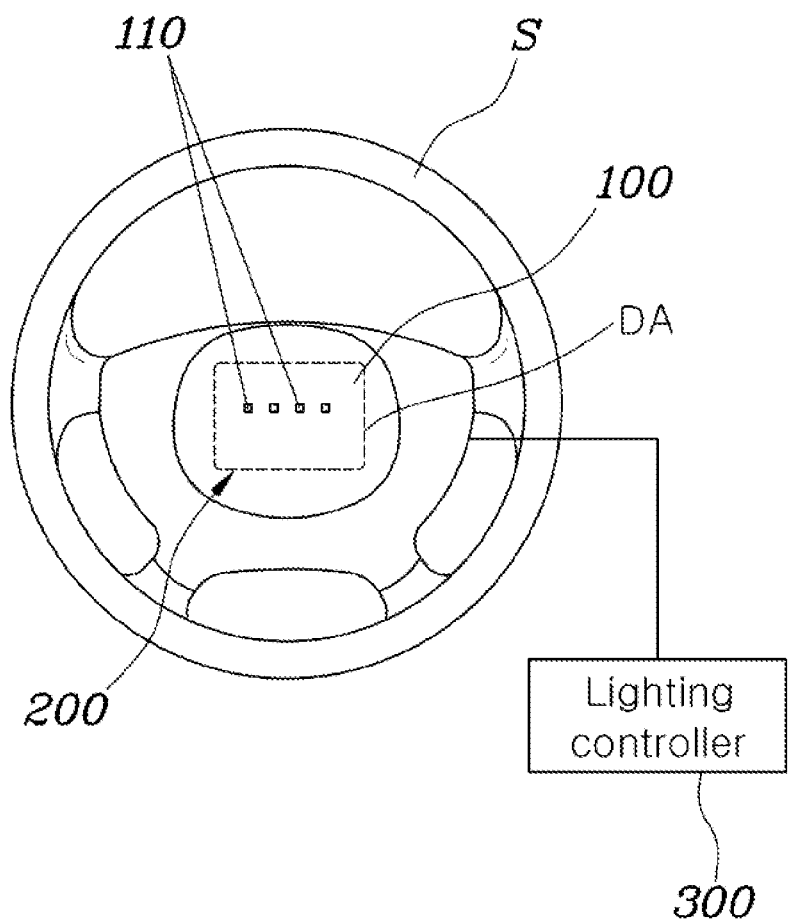
FIG. 1 is a structure view of a driver airbag module with a lighting device according to an exemplary embodiment.

All terms or words used in embodiments are selected as currently widely used general terms as possible while considering the function in the present disclosure and may vary according to intentions or precedents of those of ordinary skilled in the art, emergence of new technologies, and the like. Furthermore, the terms or words used may be arbitrarily selected by the applicant in a specific case, and in this case, the meaning thereof will be described in detail in the corresponding description of the present disclosure. Therefore, the terms will be defined based on the meanings thereof and within the technical scope of the present disclosure rather than simple names thereof.

Unless the context clearly indicates otherwise, it will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Also, the terms "~part", "~unit", "module", "apparatus" and the like mean a unit for processing at least one function or operation and may be implemented by a combination of hardware and/or software.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although an exemplary embodiment is described as using a plurality of units to perform the exemplary process, it is understood that the exemplary processes may also be performed by one or a plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinbelow, exemplary embodiments of the present disclosure will be described in detail with reference to the accompanying drawings so that the embodiments will be easily embodied by one of ordinary skill in the art to which the present disclosure belongs. The exemplary embodiments may be modified in many different forms, and the present disclosure is not limited to the exemplary embodiments.

Hereinbelow, the exemplary embodiments will be described in detail with reference to accompanying drawings.

Figure 2:
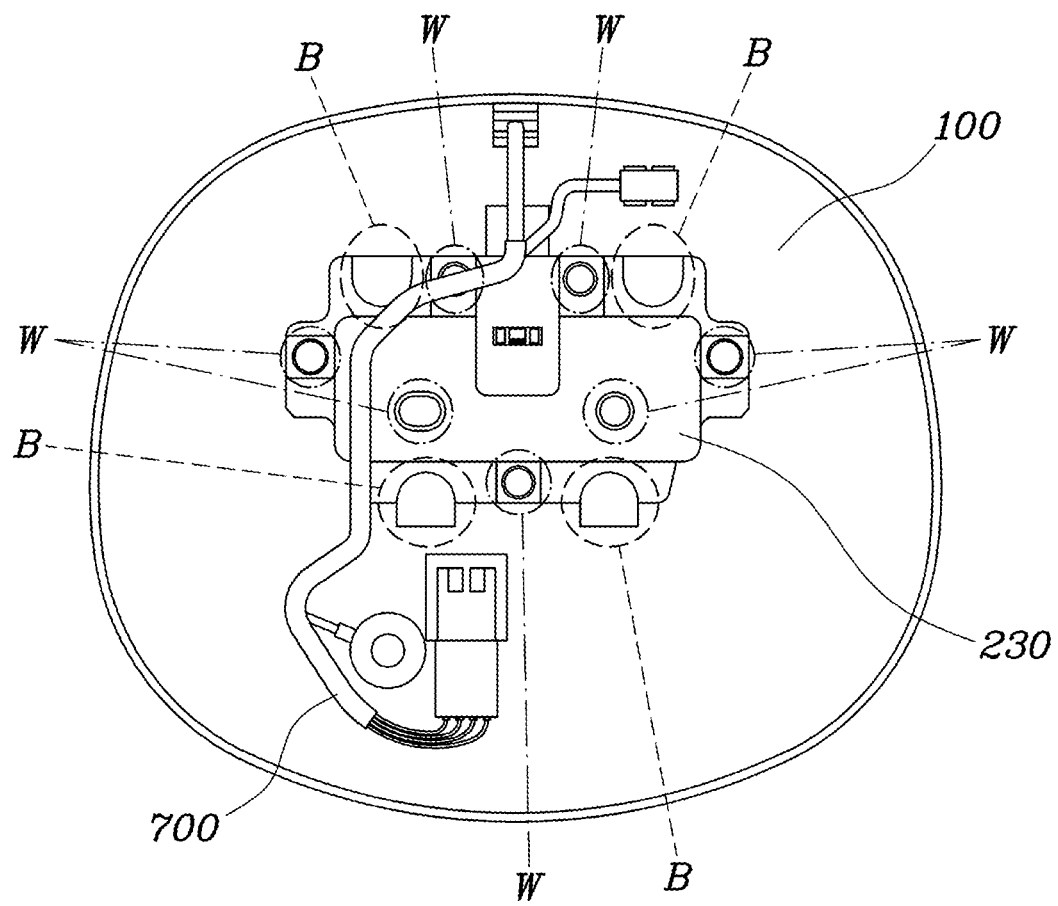
FIG. 2 is a rear view showing the driver airbag module with a lighting device according to the embodiment.
Figure 3:
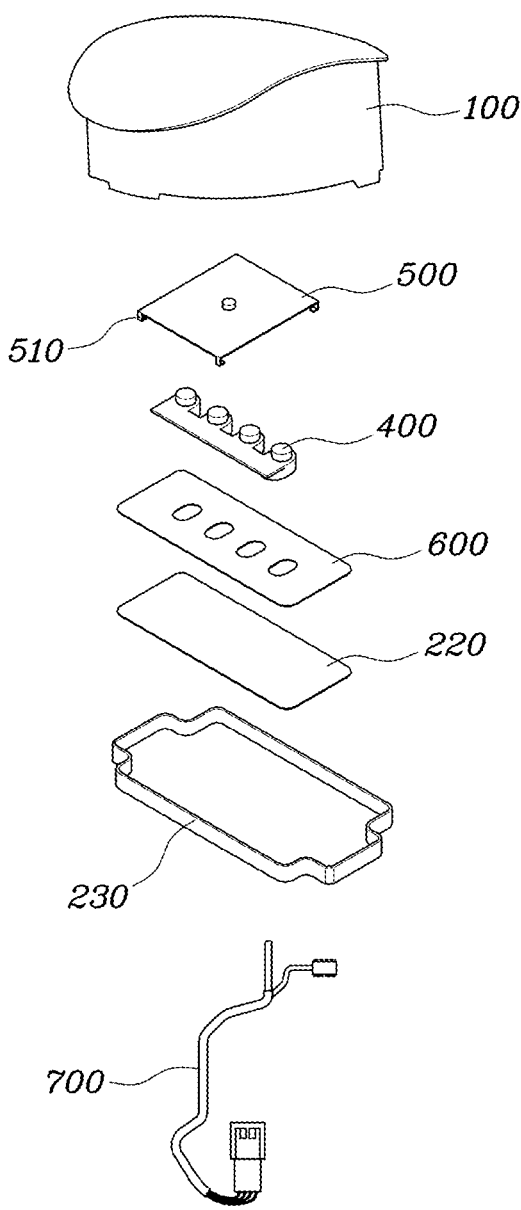
FIG. 3 is an exploded-perspective view showing the driver airbag module with a lighting device according to the embodiment.

FIG. 1 is a structure view of a driver airbag module with a lighting device 200 according to an exemplary embodiment. FIG. 2 is a rear view showing the driver airbag module with the lighting device 200 according to the embodiment. FIG. 3 is an exploded-perspective view showing the driver airbag module with the lighting device 200 according to the embodiment.

Referring to FIGS. 1 to 3, according to the embodiment, the driver airbag module with the lighting device 200 may comprise: an airbag cover 100 covering a driver airbag DA above the driver airbag DA unfolded toward a front of a driver in operating the driver airbag DA; the lighting device 200 may comprise a plurality of lamps 210 arranged to be spaced apart from each other and emitting light, and located below the airbag cover 100, and coupled to the airbag cover 100 so that the light emitted from the plurality of lamps 210 is exposed toward the upper space of the airbag cover 100; and a lighting controller 300 controlling flashing of the lighting device 200 on the basis of a vehicle driving condition, a charging status of a power source, or a driver condition.

The airbag cover 100 is provided to cover the driver airbag DA so that the driver airbag DA in an unfolded state is located below the airbag cover 100. According to the embodiment, the airbag cover 100 has a tear line, and when the driver airbag DA is unfolded and the tear line is broken, the driver airbag DA may be unfolded through the broken tear line.

The airbag cover 100 may be mounted to a center portion of a steering wheel S of the vehicle together with the driver airbag DA in a non-operation state of the driver airbag DA.

According to the embodiment, the airbag cover 100 may be manufactured in an injection-molding method, and as described below, may be injection-molded with a fixing tool 500 inserted therein. The airbag cover 100 may be integrally coupled to the steering wheel S at the center portion of the steering wheel S.

The lighting device 200 may comprise the plurality of lamps 210, and the plurality of lamps 210 may be arranged to be spaced apart from each other and emit light. Herein, the plurality of lamps 210 is configured to receive electricity and emit light, and for example, the plurality of lamps 210 may be LEDs coupled to a circuit board 220.

A plurality of penetration holes 110 is formed in the airbag cover 100 so that light penetrates through the plurality of penetration holes 110, the driver airbag module may comprise a diffuser 400 inserted into the plurality of penetration holes 110, and exposing the light emitted from the plurality of lamps 210 toward the upper space of the airbag cover 100.

The lighting device 200 may be integrally coupled to the airbag cover 100 below the airbag cover 100. Specifically, the lighting device 200 may be coupled to the airbag cover 100 such that the light emitted from the plurality of lamps 210 located below the airbag cover 100 is exposed toward the upper space of the airbag cover 100. According to the embodiment, the plurality of penetration holes 110 is formed on the airbag cover 100, and the lighting device 200 may be coupled to the airbag cover 100 such that the plurality of lamps 210 is located to correspond to the plurality of penetration holes 110.

Figure 4:
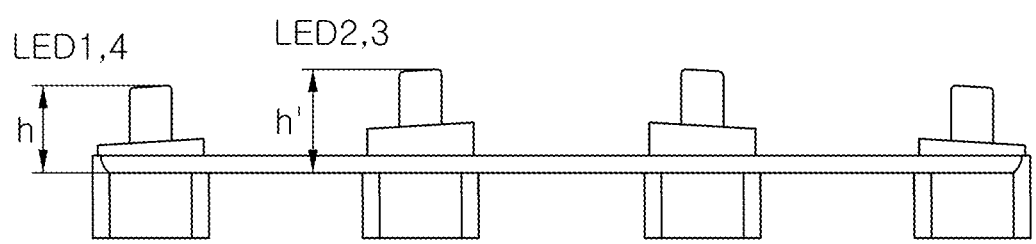
FIG. 4 is a side view showing a diffuser of the driver airbag module with a lighting device according to the embodiment.

FIG. 4 is a side view showing the diffuser 400 according to the embodiment.

Referring to FIG. 4, the diffuser 400 is inserted into the plurality of penetration holes 110 formed in the airbag cover 100 to be coupled to the airbag cover 100, has a hollow rod shape, and may have a plurality of rods corresponding to the plurality of penetration holes 110.

The lighting controller 300 may be configured to control the lighting device 200 so that, among the plurality of lamps 210, brightness of a lamp 210 located at a relatively outer portion of the airbag cover 100 is lower than brightness of a lamp located at a relatively center portion of the airbag cover 100.

According to the embodiment, the airbag cover 100 may have a shape protruding upward toward the center portion. As shown in FIG. 4, the diffuser 400 may be formed such that a height h of a rod corresponding to the lamp 210 (LED #1, #4) located at the relatively outer potion of the airbag cover 100 is lower than a height h' of a rod corresponding to the lamp 210 (LED #2, #3) located at the relatively center portion.

The lighting controller 300 may be configured to control electricity or a current input into the lamp 210 (LED #1, #4) located at the outer portion of the airbag cover 100 so that the electricity or the current is relatively lowered, and thus the light of the lamp 210 (LED #1, #4) located at the outer portion of the airbag cover 100 may be relatively reduced in brightness in comparison to the light of the lamp 210 (LED #2, #3) relatively located at the center portion. Therefore, the brightness of the light of the plurality of lamps 210 exposed through the airbag cover 100 may be uniform.

The lighting controller 300 may be configured to control flashing of the lighting device 200, and may be controlled on the basis of the vehicle driving condition, the charging status of the power source, or the driver condition. An exemplary embodiment related to control of flashing will be described below. The lighting controller 300 may be directly connected to the circuit board 220, or may be connected to the circuit board 220 through a wire harness 700.

The lighting controller 300 receives the vehicle driving condition, the charging status of the power source, or the driver condition from an external controller. The external controller may be configured to directly detect the vehicle driving condition, the charging status of the power source, or the driver condition by a sensor or may be configured to receive, indirectly, the vehicle driving condition, the charging status of the power source, and/or the driver condition.

A controller according to an exemplary embodiment of the present disclosure may be implemented by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be implemented as separate chips. Alternatively, the memory and processor may be implemented as single chips integrated with each other. The processor may take the form of one or more processors.

The plurality of lamps 210 is arranged in a straight line to be spaced apart from each other, and the lighting controller 300 may be configured to control the lighting device 200 such that the plurality of lamps 210 arranged in the straight line is turned on or off in a preset pattern, or may be turned on in a preset color.

As shown in the drawing of the embodiment, the plurality of lamps 210 may be arranged in the straight line to be transversally spaced apart from each other. For example, the lighting device 200 having four lamps 210 is shown in the drawing, but the lighting device 200 is not limited to the shown embodiment.

The lighting controller 300 may be configured to control the lighting device 200 such that a color of light of the plurality of lamps 210 arranged in the straight line is controlled, or the plurality of lamps 210 is repeatedly turned on and off in the preset pattern. As another embodiment, the lighting controller 300 may be configured to control intensity of light emitted from the plurality of lamps 210.

Furthermore, the lighting controller 300 may be configured to control the intensity of the light emitted from the plurality of lamps 210 on the basis of illuminance of the indoor space of the vehicle sensed by an illuminance sensor (not shown). For example, during day when the illuminance is relatively high, the intensity of the light of the plurality of lamps 210 is increased, and during night when the illuminance is relatively low, the intensity of the light of the plurality of lamps 210 may be reduced.

FIGS. 5 to 13 are operation views showing a lighting device applicable to the driver airbag module with a lighting device according to various embodiments.

Referring to FIGS. 5 to 13, the lighting controller 300 of the present disclosure may be configured to control the lighting device 200 according to various embodiments.

Herein, among the plurality of lamps 210, the lamp marked by a closed line is turned on, and the lamp 210 marked by a dotted line is turned off.

Figure 5:
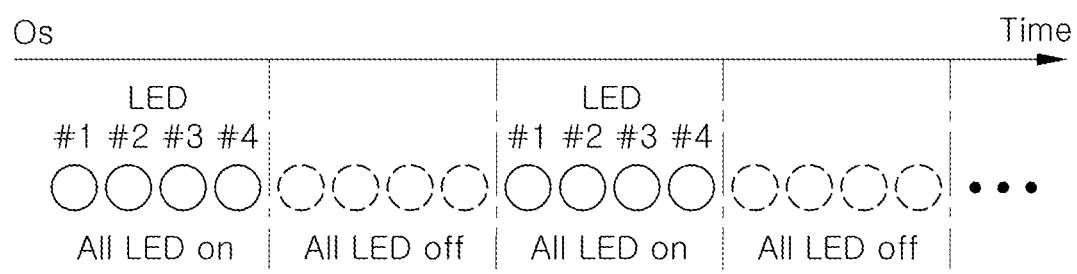
FIGS. 5 to 13 are operation views showing a lighting device applicable to the driver airbag module with a lighting device according to various embodiments.

As shown in FIG. 5, when the lighting controller 300 detects a risk in the vehicle driving condition, the lighting controller 300 may be configured to control the lighting device 200 in a pattern in which the plurality of lamps 210 is simultaneously turned on having light of a preset warning color and then is simultaneously turned off.

As an exemplary embodiment, the external controller included in an advanced driver assistance system (ADAS) may be configured to monitor or control the vehicle driving condition, and may be configured to detect a risk in the vehicle driving condition. Herein, a risk detected in the vehicle driving condition may be a risk, for example, a frontal collision risk warning or a lane departure warning.

The lighting controller 300 may be configured to control flashing of the lighting device 200 to warn a driver of a risk separately from an autonomous emergency braking (AEB) system. According to the embodiment, as shown in FIG. 5, the lighting controller 300 may be configured to control the lighting device 200 such that the plurality of lamps 210 repeats the pattern in which the plurality of lamps 210 is simultaneously turned on having light of the preset warning color and then is simultaneously turned off.

More specifically, the preset warning color may be red or amber in response to a type or a degree of the detected risk or. For example, the lighting controller 300 may be configured to control the lighting device 200 in a pattern in which the plurality of lamps 210 is turned on for 300 [ms], and then is turned off for 200 [ms].

Figure 6:
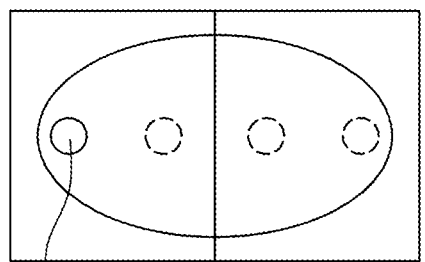
Figure 6:
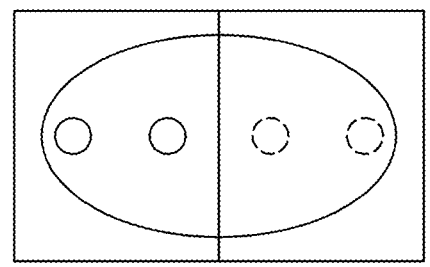
Figure 6:
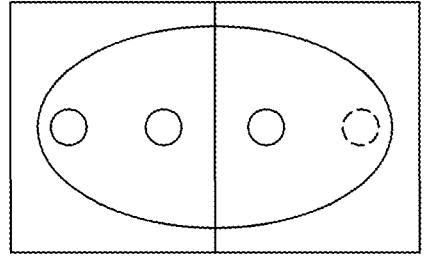
Figure 6:
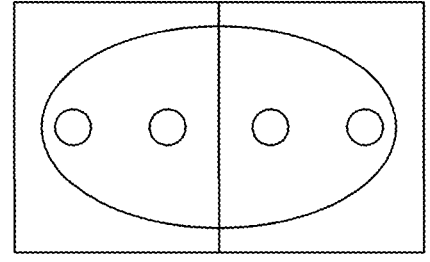
Figure 7:
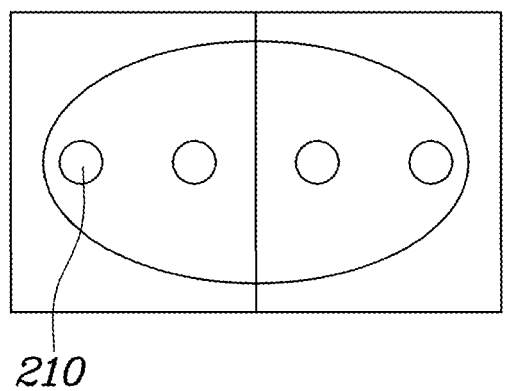

As shown in FIGS. 6 and 7, the lighting controller 300 may be configured to control the lighting device 200 in a pattern in which when it is detected that the vehicle charge is in the normal charging status of the power source, some or all of the plurality of lamps 210 is turned on at a ratio corresponding to the charging amount of the power source or when it is detected that the vehicle is in the abnormal charging status of the power source, the plurality of lamps 210 is simultaneously turned on having light of the preset warning color.

According to the embodiment, when it is detected that the vehicle is in the normal charging status of the power source, the lighting controller 300 may be configured to turn on some or all of the plurality of lamps 210 at the ratio corresponding to the charging amount of the power source. For example, the power source may be electricity to charge a battery of the vehicle, and when it is detected that the lighting controller 300 detects that the battery mounted to the vehicle is charged, the lighting controller 300 may be configured to turn on some or all of the lamps 210 at the ratio corresponding to the charging amount of the battery.

Herein, the lighting controller 300 may be configured to control the lighting device 200 such that the plurality of lamps 210 is turned on having green light.

Furthermore, the lighting controller 300 may be configured to control the lighting device 200 such that when it is detected that the vehicle is in the abnormal charging status of the power source, for example, a charger is connected to the vehicle's battery, or the vehicle's battery is in a wireless charged state but the battery is abnormal charged due to abnormal conditions such as overheating of the battery, the plurality of lamps 210 is simultaneously turned on having light of the preset warning color (for example, yellow light).

As shown in FIGS. 8 to 11, when it is detected that the driver condition is a boarding state or a leaving state, the lighting controller 300 may be configured to control the lighting device 200 in a pattern in which the plurality of lamps 210 is sequentially turned on and off from a first side to a second side thereof, or the plurality of lamps 210 is gradually turned on from the first side to the second side.

Specifically, when the driver condition is the state in which the driver board the vehicle, the lighting controller 300 may be configured to control the lighting device 200 in a welcome pattern.

Figure 8:
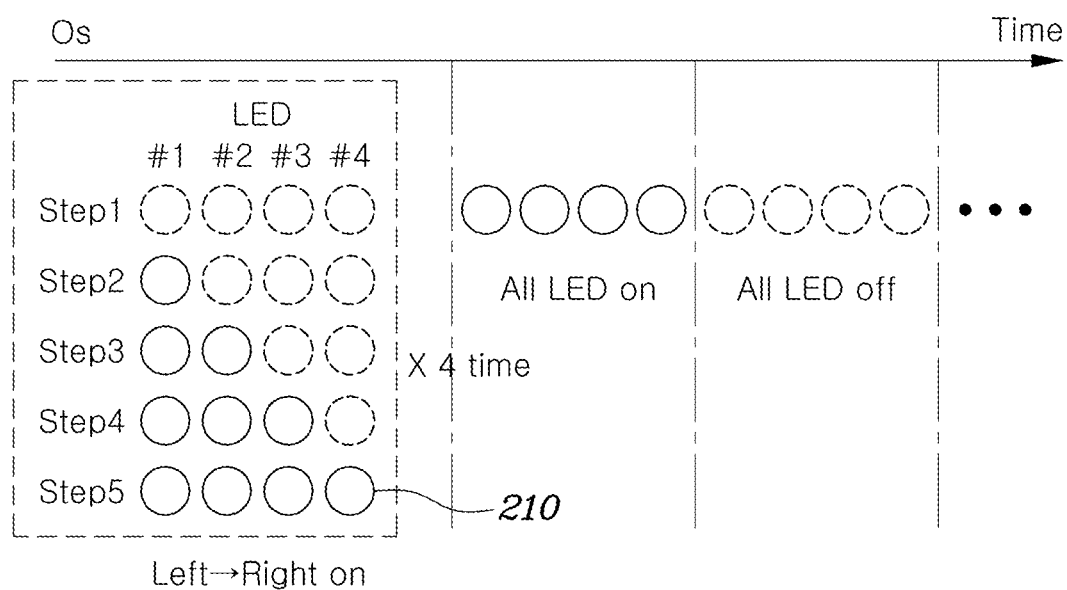
Figure 9:
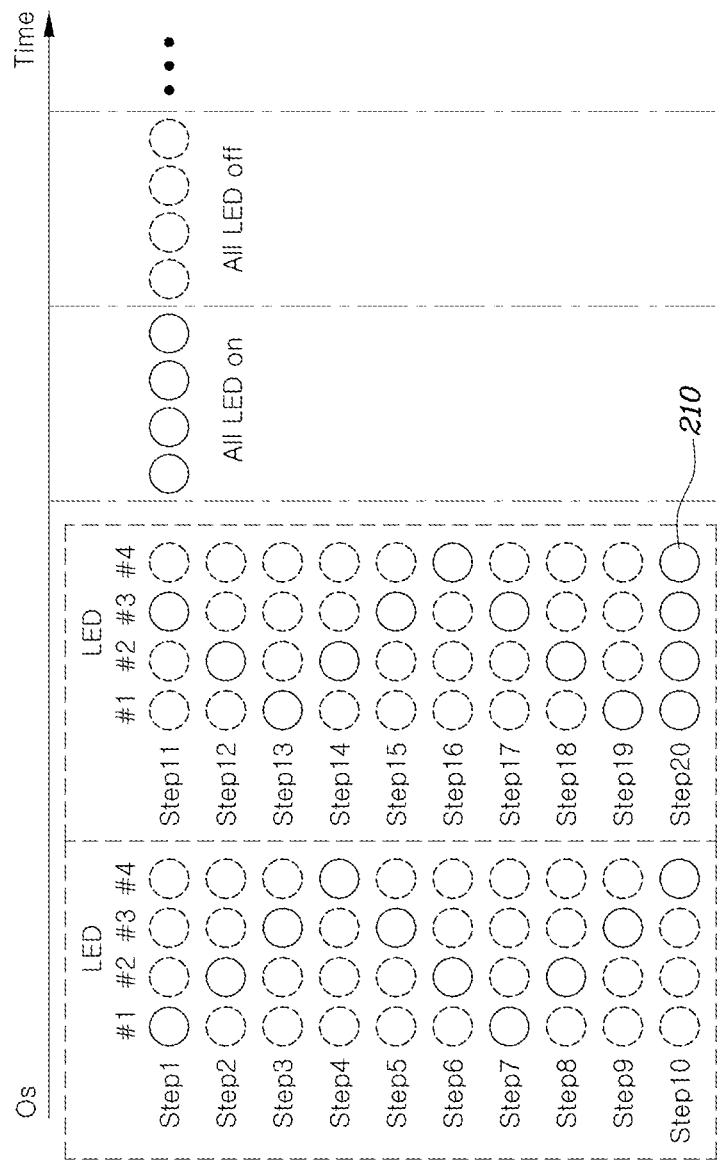

As shown in FIG. 8, the lighting controller 300 may be configured to control the lighting device 200 in a pattern in which the plurality of lamps 210 is gradually turned on from the left side to the right side, or as shown in FIG. 8, the lighting controller 300 may be configured to control the lighting device 200 in a pattern in which the plurality of lamps 210 is sequentially turned on and off from the left side to the right side.

For example, the lighting controller 300 may be configured to detect that the driver condition is the boarding state into the vehicle by detecting that a smart key of the vehicle enters the indoor space of the vehicle, or a door of a stopped vehicle is opened and then closed.

Furthermore, when the lighting controller 300 detects that the driver condition is the leaving state from the vehicle, the lighting controller 300 may be configured to control the lighting device 200 in a good bye pattern.

Figure 10:
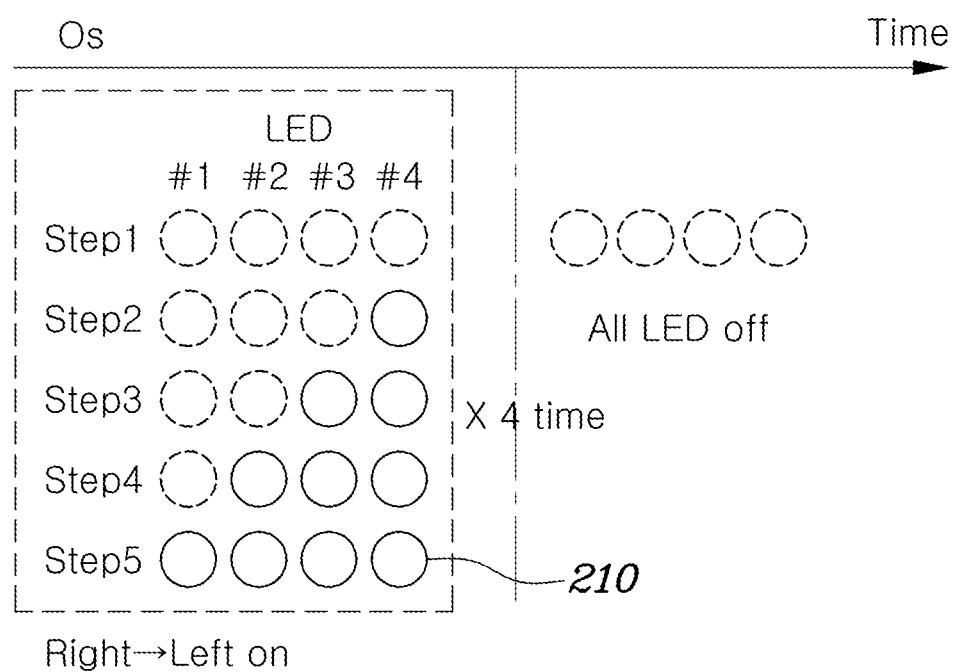
Figure 11:
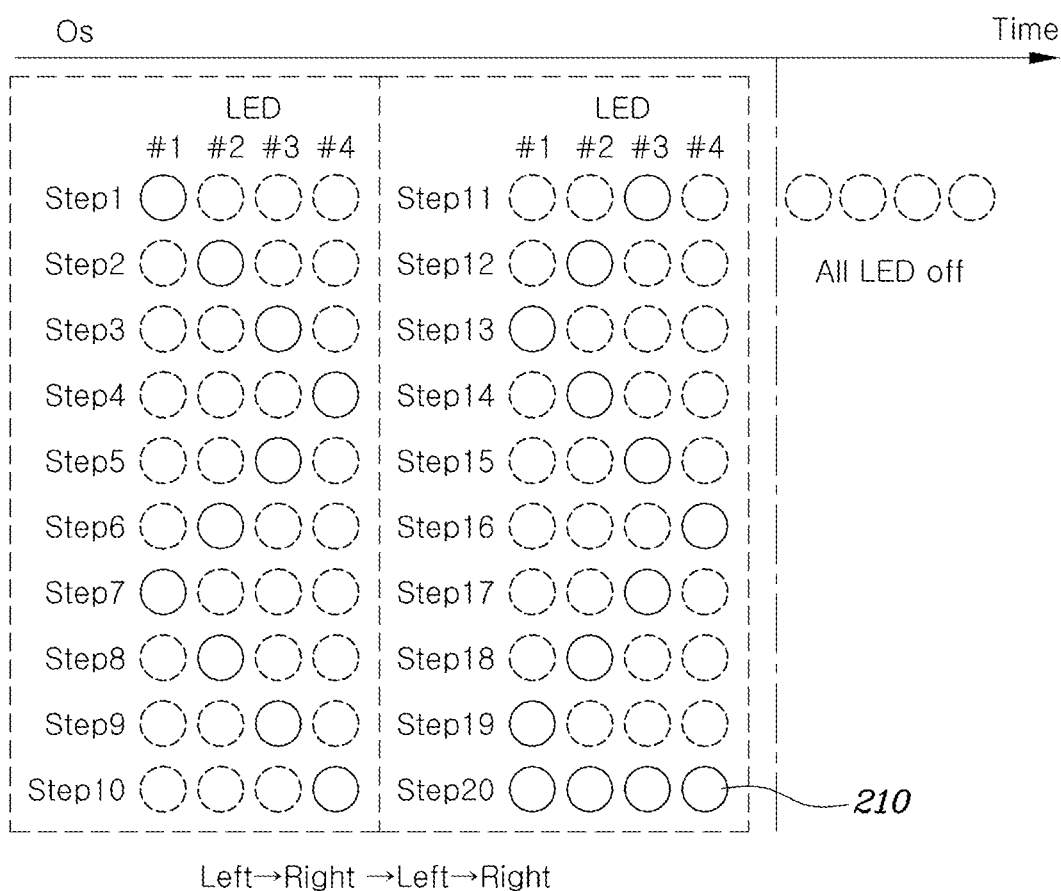

As shown in FIG. 10, the lighting controller 300 may be configured to control the lighting device 200 in a pattern in which the plurality of lamps 210 is gradually turned on from the right side to the left side, or as shown in FIG. 11, the lighting controller 300 may be configured to control the lighting device 200 in a pattern in which the plurality of lamps 210 is sequentially turned on and off from the right side to the left side. In other words, the good bye pattern may be a left and right reversed pattern from the welcome pattern.

For example, the lighting controller 300 may be configured to detect that the driver condition is the leaving state from the vehicle by detecting that the vehicle is turned off.

Herein, the lighting controller 300 may be configured to control the lighting device 200 such that the plurality of lamps 210 is turned on having blue light, and is gradually or sequentially turned on or off at an interval of 200 [ms].

Figure 12:
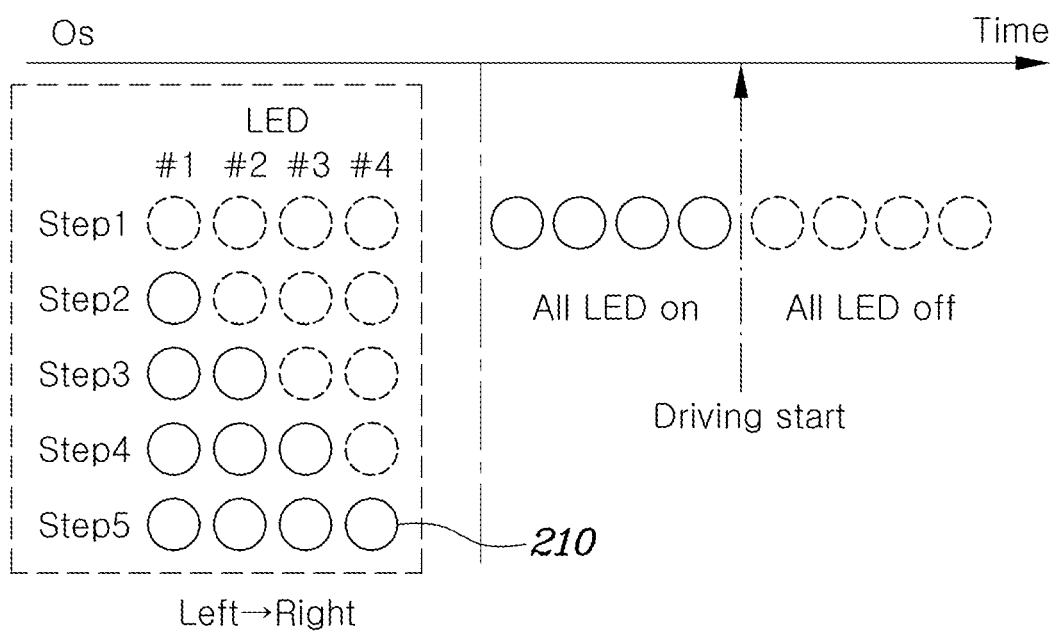

Furthermore, as shown in FIG. 12, when it is detected that the vehicle driving condition is a start-up state, the lighting controller 300 may be configured to control the lighting device 200 in a pattern in which the plurality of lamps 210 is gradually turned on from the left side to the right side, and when the starting of the vehicle is completed, the lighting controller 300 may be configured to control the lighting device 200 in a pattern in which all of the plurality of lamps 210 maintains an ON state.

Furthermore, when it is detected that the vehicle driving condition is a driving start state, the lighting controller 300 may be configured to control the lighting device 200 such that all of the plurality of lamps 210 are turned off.

Figure 13:
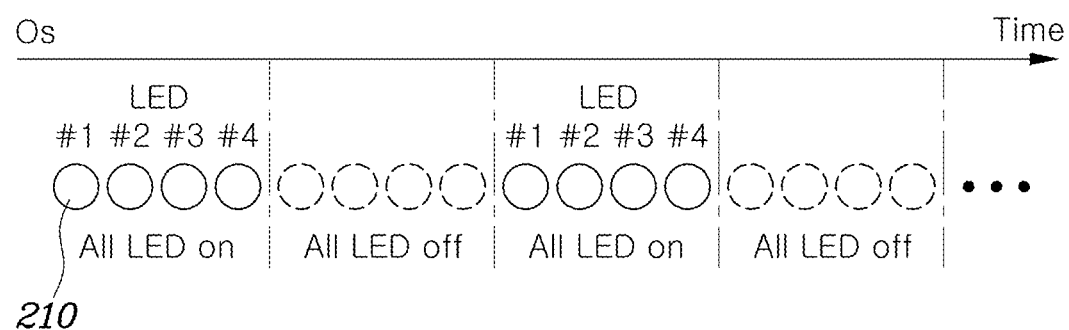

As shown in FIG. 13, when it is detected that the driver condition is a manipulation input state, the lighting controller 300 may be configured to control the lighting device 200 in a pattern in which the plurality of lamps 210 is simultaneously turned on having light of a preset manipulation color and then simultaneously turned off.

According to the embodiment, the manipulation input state of the driver condition is a state in which the driver inputs voice manipulation into the vehicle, and the lighting controller 300 may be configured to control the lighting device 200 in a pattern indicating that the driver's voice is recognized in the vehicle.

Herein, the lighting controller 300 may be configured to control the lighting device 200 such that the plurality of lamps 210 is turned on having white light, and is turned on and off at an interval of 500 [ms].

Figure 14:
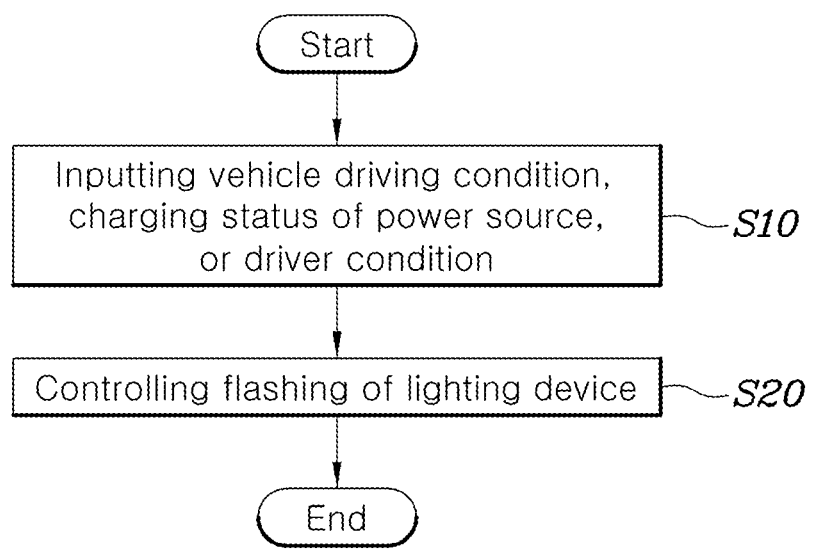
FIG. 14 is a flowchart of a control method of the driver airbag module with a lighting device according to another embodiment.

FIG. 14 is a flowchart of a control method of the driver airbag module with the lighting device 200 according to another embodiment.

Referring to FIG. 14, according to another embodiment, a control method, which controls the driver airbag module with the lighting device 200 coupled to the airbag cover 100 so as to expose light emitted from the plurality of lamps 210 located below the airbag cover 100 toward the upper space of the airbag cover 100, may comprise: inputting the vehicle driving condition, the charging status of the power source, or the driver condition; and controlling flashing of the lighting device 200 such that the plurality of lamps 210 is turned on and off in the preset pattern, or is turned on in the preset color on the basis of the vehicle driving condition, the charging status of the power source, or the driver condition that are input.

In the controlling the flashing of the lighting device 200, when a risk is detected in the vehicle driving condition, the lighting controller 300 may be configured to control the lighting device 200 in the pattern in which the plurality of lamps 210 is simultaneously turned on having light of the preset warning color and then is turned off.

In the controlling the flashing of the lighting device 200, when it is detected that the vehicle is in the normal charging status of the power source, the lighting controller 300 may be configured to control the lighting device 200 in the pattern such that some or all of the plurality of lamps 210 is turned on at a ratio corresponding to the charging amount of the power source.

In the controlling the flashing of the lighting device 200, when it is detected that the vehicle is in the abnormal charging status of the power source, the lighting controller 300 may be configured to control the lighting device 200 in the pattern in which the plurality of lamps 210 is simultaneously turned on having light of the preset warning color.

In the controlling the flashing of the lighting device 200, when it is detected that the driver condition is the boarding state into the vehicle or the leaving state from the vehicle, the lighting controller 300 may be configured to control the lighting device 200 in the pattern in which the plurality of lamps 210 is sequentially turned on and off from the first side to the second side or the plurality of lamps 210 is gradually turned on from the first side to the second side.

In the controlling the flashing of the lighting device 200, when it is detected that the driver condition is the manipulation input state into the vehicle, the lighting controller 300 may be configured to control the lighting device 200 in the pattern in which the plurality of lamps 210 is simultaneously turned on having light of the preset manipulation color and then simultaneously turned off.

Figure 15:
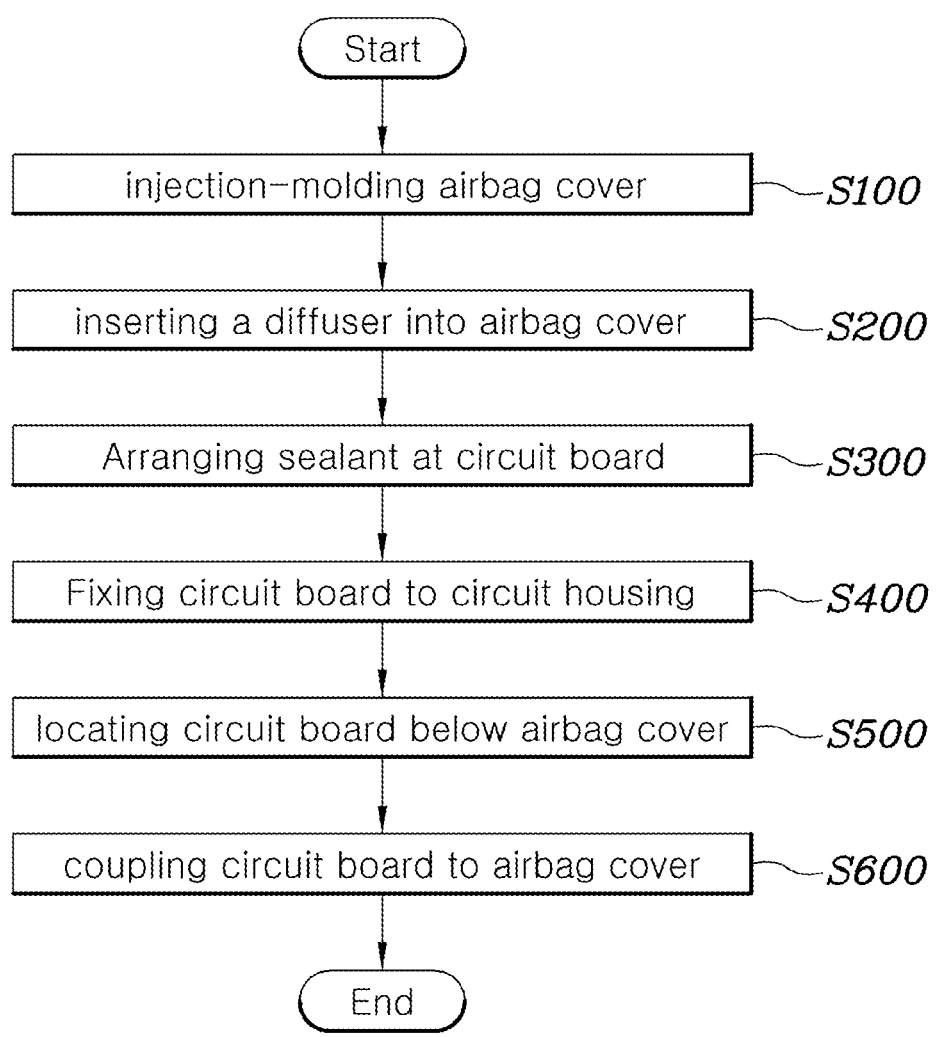
FIG. 15 is a flowchart of a driver airbag module with a lighting device according to another embodiment.

FIG. 15 is a flowchart of the driver airbag module with the lighting device 200 according to another embodiment.

Referring to FIG. 15, according to another embodiment, a manufacturing method of the driver airbag module with the lighting device 200 may comprise: injection-molding the airbag cover 100, which has the plurality of penetration holes 110 through which light penetrates, with the fixing tool 500 of a deformable material inserted therein; locating the circuit board 220 with the plurality of lamps 210 below the airbag cover 100; and coupling the circuit board 220 to the airbag cover 100 while the circuit board 220 is fixed to the airbag cover 100 by deforming the fixing tool 500.

The plurality of penetration holes 110 is formed in the airbag cover 100 so that the plurality of lamps 210 located below the airbag cover may be exposed toward the upper space of the airbag cover.

The fixing tool 500 may be made of the deformable material, and the deformable material may have a fusing point higher than the airbag cover 100 formed by the injection molding method. For example, the fixing tool 500 may be made of metal. A plurality of legs 510 provided in the fixing tool 500 is deformed with the circuit board 220 located below the airbag cover 100, so that the circuit board 220 may be fixed.

The circuit board 220 may be solidly coupled to the airbag cover 100 by being secondarily coupled to the airbag cover in the primary coupled state by the deformation of the fixing tool 500.

Before the locating of the circuit board 220, the manufacturing method may comprise: inserting the diffuser 400 into the plurality of penetration holes 110 to expose light emitted from the plurality of lamps 210 toward the upper space of the airbag cover 100, and
 in the locating of the circuit board 220, the plurality of lamps 210 may be located to correspond to a position of the diffuser 400.

The diffuser 400 is composed of a plurality of rods, and the plurality of rods may be respectively inserted into the plurality of penetration holes 110. Furthermore, the diffuser 400 may be coupled to the airbag cover 100 by a fusion process.

Before the locating of the circuit board 220, the manufacturing method may comprise: arranging a sealant 600 at an upper portion of the circuit board 220; and fixing the circuit board 220 to a circuit housing 230 in a snap structure, and
 in the coupling of the circuit board 220 to the airbag cover 100, the circuit housing 230 may be coupled to the airbag cover 100.

Herein, the sealant 600 may be made of rubber, and may seal the circuit board 220 to prevent moisture from leaking into the circuit board 220.

The circuit board 220 may be fixed to the circuit housing 230 in the snap structure, the circuit housing 230 may be directly coupled to the airbag cover 100, and the circuit board 220 fixed to the circuit housing 230 may be coupled to the airbag cover 100 through the circuit housing 230.

In the coupling of the circuit board 220 to the airbag cover 100, the fixing tool 500 is bent with the circuit board 220 located below the airbag cover 100, so that the circuit housing 230 is primarily fixed to the airbag cover 100, and the circuit housing 230 may be fusion-coupled to the airbag cover 100 at a bending position B of the fixing tool 500 and a position W spaced from the bending position B.

Specifically, the circuit housing 230 and the airbag cover 100 may be fusion-coupled to each other at positions B (for example, 4 points) where the plurality of legs 510 provided in the fixing tool 500 is bent, and may be additionally fusion-coupled to each other at positions W (for example, 5 positions) spaced apart from the bending positions B.

Accordingly, when the number of the legs 510 of the fixing tool 500 is reduced, mass-productivity thereof can be improved.

Although the preferred embodiments of the present disclosure have been disclosed in detail only with respect to the above specific embodiments, those skilled in the art will appreciate that various modifications, additions, and substitutions are possible, without departing from the spirit and scope of the present disclosure, and it is understood that the various modifications, additions, and substitutions belong to the accompanying claims.

What is claimed is:

1. A driver airbag module, comprising:
an airbag cover configured to cover a driver airbag which unfolds toward a front space of a driver when a driver airbag is operated,
wherein the airbag cover covers the driver airbag and is located above the driver airbag;
a lighting device comprising a plurality of lamps, wherein the plurality of lamps:
 are arranged such that the plurality of lamps are spaced apart from each other,
 are configured to emit light,
 are located below the airbag cover, and
 are coupled to the airbag cover such that the light emitted from the plurality of lamps is exposed to an upper space of the airbag cover; and
a lighting controller configured to control flashing of the lighting device based on a charging status of a power source or a driver condition;
wherein, when it is detected that the vehicle is in a normal charging status of the power source, the lighting controller is configured to control the lighting device in a pattern in which some or all of the plurality of lamps is turned on at a ratio corresponding to a charging amount of the power source; or
wherein, when it is detected that the vehicle is in an abnormal charging status of the power source, the lighting controller is configured to control the lighting device in a pattern in which the plurality of lamps is simultaneously turned on, having light of a warning color.

2. The driver airbag module of claim 1, wherein the airbag cover is mounted to a center portion of a steering wheel of the vehicle, together with the driver airbag, in a non-operation state of the driver airbag.

3. The driver airbag module of claim 1, wherein the lighting controller is further configured to control the flashing of the lighting device based on a driving condition of a vehicle.

4. The driver airbag module of claim 1, wherein:
the airbag cover comprises a plurality of penetration holes through which the light emitted from the plurality of lamps penetrates, and the driver airbag module further comprises:
a diffuser, inserted into the plurality of penetration holes, configured to expose the light emitted from the plurality of lamps toward the upper space of the airbag cover.

5. The driver airbag module of claim 1, wherein the lighting controller is configured to control the lighting device such that the plurality of lamps is turned on and off in a preset pattern.

6. The driver airbag module of claim 1, wherein, when a risk in the driving condition of the vehicle is detected, the lighting controller is configured to control the lighting device in a pattern in which the plurality of lamps is simultaneously turned on, having light of a preset warning color, and then the plurality of lamps is simultaneously turned off.

7. The driver airbag module of claim 1, wherein the lighting controller is configured to control the lighting device such that a brightness of a lamp, among the plurality of lamps, located at a generally outer portion of the airbag cover, is lower than a brightness of a lamp, among the plurality of lamps, located at a center portion of the airbag cover.

8. The driver airbag module of claim 1, wherein the plurality of lamps is arranged in a straight line while being spaced apart from each other.

9. A driver airbag module, comprising:
an airbag cover configured to cover a driver airbag which unfolds toward a front space of a driver when a driver airbag is operated,
wherein the airbag cover covers the driver airbag and is located above the driver airbag,
a lighting device comprising a plurality of lamps, wherein the plurality of lamps:
are arranged such that the plurality of lamps are spaced apart from each other,
are configured to emit light,
are located below the airbag cover, and
are coupled to the airbag cover such that the light emitted from the plurality of lamps is exposed to an upper space of the airbag cover; and
a lighting controller configured to control flashing of the lighting device based on a charging status of a power source or a driver condition;
wherein, when it is detected that the driver condition is a boarding state into the vehicle or a leaving state from the vehicle, the lighting controller is configured to control the lighting device in a pattern in which:
the plurality of lamps is sequentially turned on and off from a first side to a second side thereof; or
the plurality of lamps is gradually turned on from the first side to the second side thereof.

10. A driver airbag module, comprising:
an airbag cover configured to cover a driver airbag which unfolds toward a front space of a driver when a driver airbag is operated,
wherein the airbag cover covers the driver airbag and is located above the driver airbag,
a lighting device comprising a plurality of lamps, wherein the plurality of lamps:
are arranged such that the plurality of lamps are spaced apart form each other,
are configured to emit light,
are located below the airbag cover, and
are coupled to the airbag cover such that the light emitted from the plurality of lamps is exposed to an upper space of the airbag cover; and
a lighting controller configured to control flashing of the lighting device based on a charging status of a power source or a driver condition:
wherein, when it is detected that the driver condition is a state in which the driver inputs manipulation into the vehicle, the lighting controller is configured to control the lighting device in a pattern in which the plurality of lamps is simultaneously turned on, having light of a preset manipulation color, and then the plurality of lamps is simultaneously turned off.

* * * * *